United States Patent
Offerle et al.

(10) Patent No.: US 8,845,890 B2
(45) Date of Patent: Sep. 30, 2014

(54) HYDRAULIC RESERVOIR WITH SELF-BYPASSING FILTER

(75) Inventors: Timothy Gerard Offerle, Saline, MI (US); Ron Perri, Northville, MI (US); Sterling Douglas Schmeltz, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 13/251,208

(22) Filed: Oct. 1, 2011

(65) Prior Publication Data

US 2013/0081985 A1    Apr. 4, 2013

(51) Int. Cl.
*B01D 35/147*    (2006.01)
*B62D 5/06*    (2006.01)
*F15B 1/26*    (2006.01)
*F15B 21/04*    (2006.01)

(52) U.S. Cl.
CPC ............ *B62D 5/062* (2013.01); *B01D 2313/04* (2013.01); *F15B 21/041* (2013.01); *B01D 35/147* (2013.01); *B01D 2313/083* (2013.01); *F15B 1/26* (2013.01)

USPC ................ 210/167.01; 210/416.4; 210/416.5; 210/171; 210/254; 210/262; 210/130; 210/131; 210/133; 210/149; 137/574

(58) Field of Classification Search
CPC ..................... B01D 2313/04; B01D 2313/083; B01D 2313/086; B01D 2313/58; B01D 35/147; B62D 5/062; F15B 1/26; F15B 21/041
USPC ................ 210/167.01, 130, 131, 133, 416.4, 210/416.5, 171, 254, 262, 149; 137/574
See application file for complete search history.

(56) References Cited

U.S. PATENT DOCUMENTS

| | | | |
|---|---|---|---|
| 3,441,139 A * | 4/1969 | McCormick | 210/149 |
| 2004/0187931 A1* | 9/2004 | Crossman et al. | 137/549 |

* cited by examiner

*Primary Examiner* — Allison Fitzsimmons
(74) *Attorney, Agent, or Firm* — Joseph E. Root

(57) ABSTRACT

A self-bypassing filter system for a fluid reservoir. The system includes a filter disposed within the reservoir, positioned to intercept the fluid flow proceeding out of the reservoir. A bypass fluid flow path extending from upstream to downstream of the filter, without passing through the filter. In addition, the system includes a membrane, positioned to completely block the bypass fluid flow path upstream of the filter, the membrane being formed of a material dissolvable in the fluid.

10 Claims, 2 Drawing Sheets

HYDRAULIC RESERVOIR WITH SELF-BYPASSING FILTER

TECHNICAL FIELD

This application relates generally to vehicular steering systems and more particularly to filtering hydraulic fluid employed within steering systems.

BACKGROUND

Power steering systems are commonly employed in vehicles to assist drivers. Indeed, power steering systems are now the norm with customers expecting trouble free operation.

During vehicle manufacturing and assembly, and particularly during initial engine run-in, there exists a high likelihood that impurities may be introduced into the system. These impurities can range from small metallic pieces to large dust and dirt particles. That fact is especially true in cases of hydraulic fluid lines, implemented throughout the vehicle for a varied set of application, such as the steering system.

Debris in the hydraulic steering system may circulate through the fluid lines during the initial stages of the vehicle's operation. Any condition where an impurity lodges in the system, whether in the hydraulic steering pump or any other component, the resulting obstruction may choke the fluid flow, leading to major failures. Damages involved in such cases may be irreversible and may lead to a complete component replacement. Even if the blockage does not affect components directly, it may choke the fluid flow, affecting the resultant work output of the components, leading to inefficiencies in the system.

Conventional methods for removing contaminants generated during engine run-in, attempted at a later time such as during vehicle repairs or service, are ineffective and time consuming. Some equipment manufacturers address this problem by employing a temporary filter when first operating the hydraulic steering. That approach can be problematic, because temporary filters rapidly become redundant. Further, where permanent filters remain in the system, they produce ongoing pressure losses. That state becomes worse during low temperature conditions, where increased fluid viscosity requires higher energy from the engine for effective circulation. Also, the cost of a permanent filter arrangement makes that solution unattractive for mass manufacturing. Similarly, solutions employing a pressure activated filter bypass mechanism cause overall pressure losses, resulting in higher energy consumption.

Thus, the need remains for an improved, energy efficient, inexpensive system that effectively removes contaminants from a vehicle's hydraulic steering system during engine run-in all without affecting long-term efficiency

SUMMARY

One embodiment of the present disclosure describes a self-bypassing filter system for a fluid reservoir. The system includes a filter disposed within the reservoir, positioned to intercept the fluid flow proceeding out of the reservoir. A membrane, dissolvable in the fluid, is positioned in the path of the incoming fluid to completely block and divert the flow, forcing it to travel an alternate path, through the filter. A complete dissolution of the membrane occurs rapidly, opening a bypass fluid flow path extending from upstream of the filter element to downstream of the filter. The fluid thereafter exits the reservoir without encountering a filter. a bypass fluid flow path extending from upstream of the filter to downstream of the filter, without passing through the filter; and Certain embodiments disclose a hydraulic fluid reservoir including a filter, positioned to intercept the fluid flowing out of the reservoir, thereby providing a temporary fluid flow path. This interception is enabled through a dissolvable membrane positioned in the path of the fluid flow, blocking and diverting the flow, forcing it to pass through the filter. A total dissolution of the membrane in the fluid over a period of varying temperatures produces sequential activation of a bypass fluid flow path, allowing the fluid to avoid the filter altogether, providing an alternate exit path.

Another embodiment discloses a hydraulic steering system in a vehicle comprising a steering unit, a hydraulic steering pump and a hydraulic fluid reservoir. The fluid reservoir presents dual fluid flow paths, assisted through an internally activated self-bypassing filter mechanism, with the paths being activated consecutively. The first fluid flow path passes through a filter, while the second bypasses the filter entirely. The embodiment begins operation the first time the engine is operated, with the first flow path being followed. A dissolvable membrane initially directs fluid flow through the filter element, until its total dissolution opens an alternate filter bypass path, automatically bypassing the filter.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

The proposed solution discloses a hydraulic fluid reservoir that incorporates a self-bypassing filtration system. In general, the present disclosure sets out an apparatus and method for removing contaminants present in a hydraulic system, such as a power steering mechanism, during initial engine run-in. To accomplish that result, a temporary filter is provided in the hydraulic fluid reservoir. The reservoir and the filter are structured having two flow paths. A temporary flow path passes fluid through the filter in the reservoir, while the permanent flow path bypasses the filter. A dissolvable membrane blocks access to the permanent flow path, limiting fluid flow to the temporary flow path. The membrane is structured to dissolve after a desired amount of time, allowing fluid to bypass the filter entirely.

Exemplary Embodiments

Figure 1:
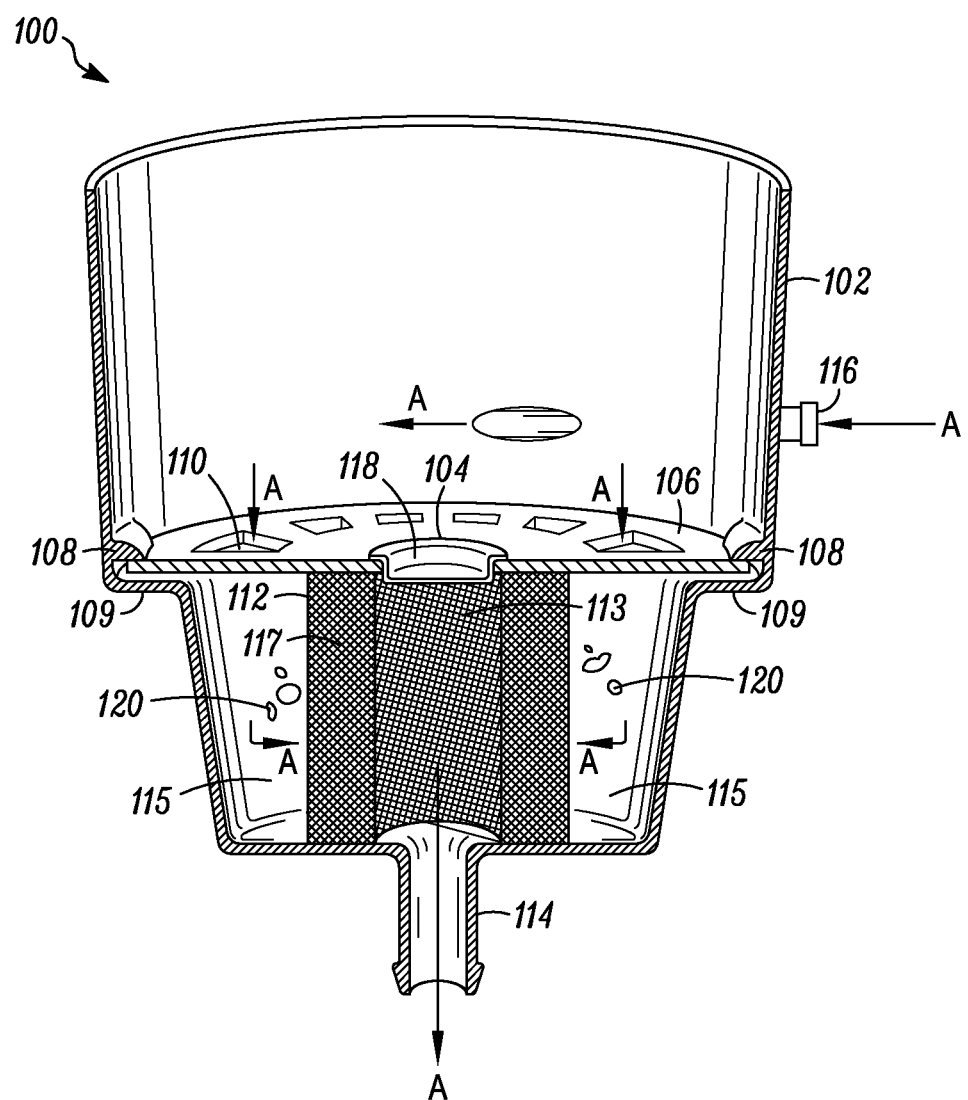
FIG. 1 is a cross-sectional side view of an exemplary fluid reservoir according to an embodiment of the present disclosure.

FIG. 1 illustrates a cross-sectional view of a self-bypassing filter employed in a hydraulic fluid reservoir 100. The system comprises a fluid reservoir 102, having a filter 112 position in the path of fluid flow between the reservoir inlet 116 and the outlet 114. As discussed in more detail below, filter 112 is structured to permit fluid flow through filter elements 117 or through a central aperture 113.

Fluid reservoir 102 is adapted to store the hydraulic fluid. In the illustrated embodiment, the reservoir 102 takes a cylindrical form, but other shapes are known in the art and can easily be employed. In particular, components such as hydraulic fluid reservoirs can be formed in a number of shapes without losing their functionality, and thus these components are often shaped to optimize space utilization within an engine compartment. Filter 112 is housed within the fluid reservoir 102. As illustrated, this component is generally cylindrical in form, having a filter element 117 surrounding a central aperture 113. The filter 112 is positioned over outlet 114, such that central aperture 113 overlies and is in direct communication with outlet 114. Structure and positioning of the filter 112, as shown, assists in the formations of consecutively activated dual fluid flow paths. The first path is defined through the filter element 117, intercepting the incoming fluid, and a second filter bypass alternative flow path extending from the upstream of the filter to the downstream of the filter, without passing through the filter element 117. Importantly, the filter could be made up of materials such as cotton waste, pleated filter paper, mesh made of nylon, polypropylene, brass, copper, steel, stainless steel, aluminum, or polyester.

A retainer baffle disk 106 lies directly atop the filter 112 and serves to locate and retain filter 112 in position. Grooves or slots are included in the baffle disk 106 to assist in restricting the filter 112 from vibratory movements. The baffle disk 106 can be secured in position by any of a number of known mechanical devices. Snapping members are employed at the periphery of the baffle disk to secure it to the inner confines of the fluid reservoir 102. In the illustrated embodiment, the disk 106 rests upon a ledge 109 formed in the reservoir body, with the disk's outer edge being retained by clips 108 molded into the reservoir's inner sidewalls. As will be appreciated by those in the art, a wide variety of alternate retaining mechanisms can be chosen as desired. Baffle disk 106 can be installed by fitting peripheral indentations (not shown) over clips 108, and then rotating the disk 106 to lock in position. In that position, the disk 106 exerts sufficient downward pressure on filter 112 to retain that device in the desired position over outlet 114.

Openings 110 extend through baffle disk 106. These openings 110 may be sized, and their number may be selected, to provide a desired fluid flow, as will be understood by those in the art. In the illustrated embodiment, 12 apertures are provided, spaced equidistantly around the periphery of baffle disk 106.

Fluid port 118 lies at the center of the baffle disk 106, sized to fit directly over central aperture 113. A membrane 104, dissolvable in the fluid is fixed into the fluid port 118, completely blocking it. That arrangement defines a temporary flow path, indicated by arrow A, entering the reservoir at inlet 116, flowing through openings 110 to collection zone 115. The latter area is the collection zone 115 at the bottom of reservoir 102, lying between the sidewalls of the reservoir and the periphery of filter 112. The temporary flow path A continues through filter element 117, into central aperture 113. Fluid on that path exits the reservoir through outlet 114.

The primary characteristic of membrane 104 is that it dissolves in the fluid in a predetermined period. The membrane is formed of a chemically stable material such as polycarbonate The rate of dissolution is understood, so the membrane can be designed in the illustrated embodiment, membrane 104 so that to provide adequate filtering time as determined by system testing, which provides for operational on temporary flow path a for approximately 30 min. Other materials that could be substituted for the membrane 104 include polystyrene, low density polyethylene, polymethylpentene.

Figure 2:
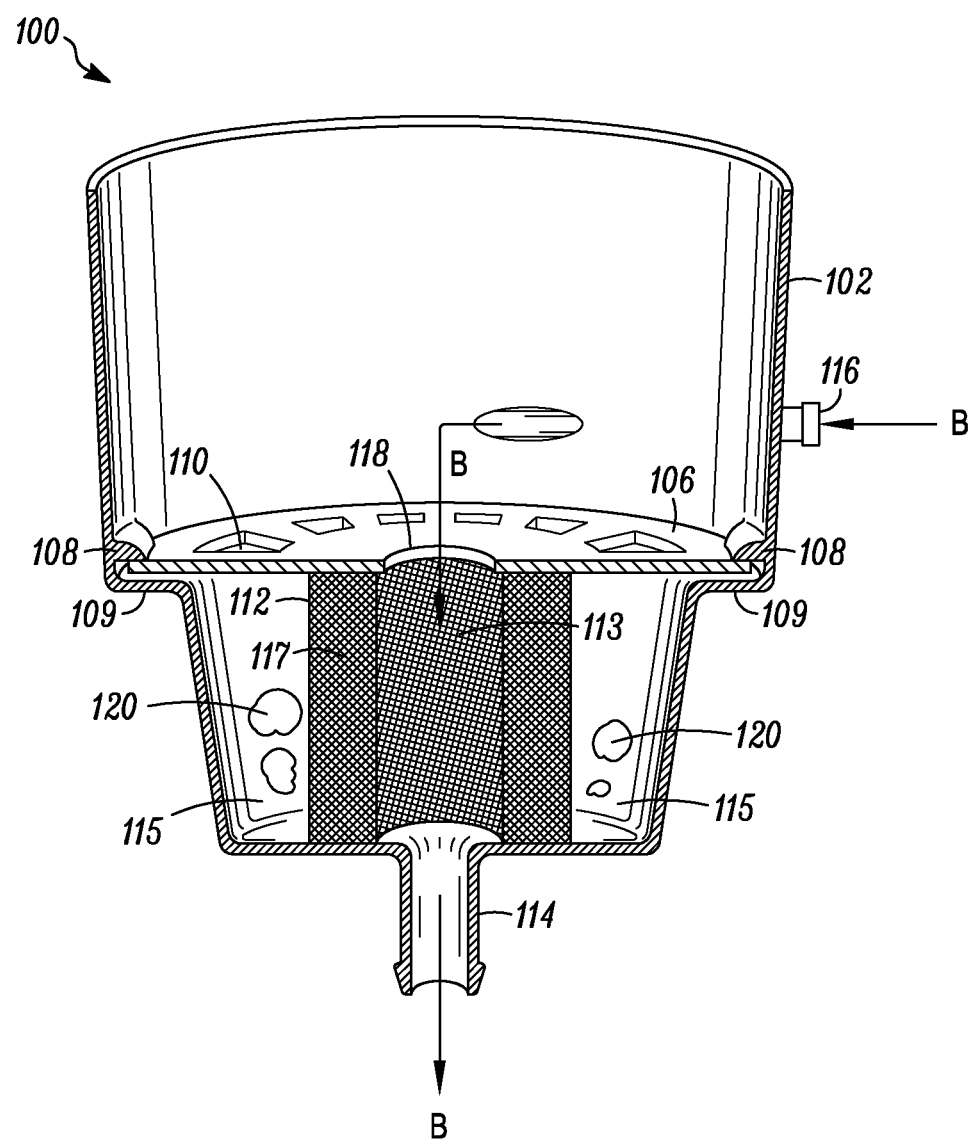
FIG. 2 is a cross-sectional side view of an exemplary fluid reservoir equipped with a self-bypassing filter system, illustrating the system after the membrane has dissolved.

FIG. 2 depicts the self-bypassing filter 112 in a state in which dissolvable membrane 104 has completely dissolved. At that point, the low-pressure route for fluid flow becomes permanent flow path B. There, hydraulic fluid enters the reservoir 102 at inlet 116, flows through port 118 into central aperture 113, and exits via outlet 114. No further filtration of the fluid occurs at this point. This cycle remains unchanged for the remainder of the vehicle's operational life.

Reservoir 102 and baffle disk 106 can be manufactured using any convenient metal or high-grade plastic material, such as Nylon-6. As known in the art, requirements for both elements are long term chemical stability, particularly in the presence of hydraulic fluid, as well as mechanical stability and durability. Filter 112 may be a conventional filter employed in the art for filtering hydraulic fluid, having a pore size not larger than 10 micrometers. Alternatively, the dissolvable membrane 104 could be replaced with an optimally positioned valve element at the port 118 of the retaining baffle disk 106. Such an arrangement would provide the same functionality as obtained from dissolvable membrane 104, by providing an initial flow on temporary flow path A, switching after a short time to a permanent flow path B.

After the initial vehicular startups and operations, by when the contaminants eventually filter out through the temporary filter 112, this valve can be switched open, activating the filter bypassing function. This switching can be performed through a manual intervention, either through conveniently placed controls within the vehicle or by physically switching open the valve by going under the hood.

A valve switching mechanism, as disclosed above, can particularly be applicable in cases of an inadvertent escape of the contaminants 120 from their trapped state in the reservoir 102, and start circulating with the hydraulic fluid again. Upon detection of such a state, the operator can accordingly close the valve again, restoring filtration to the flow of fluid.

An automatic system could be employed to activate and deactivate the filter bypassing mechanism, as disclosed. Such a system could be assisted through a series of pressure sensors placed optimally around the system lines. An arrangement of this sort would detect variations in fluid flow pressures causing the valve to actuate accordingly. Such detections can be configured to form a signal, resulting from an increase in fluid pressure above a predetermined threshold, and that signal can be fed to a controller. The controller, consequently, may operate an actuator to close the valve, stopping the bypass and forcing the fluid to pass through the filter 112. Similarly, a fluid pressure below a predetermined threshold may signal the controller to actuate the valve, opening the fluid filter bypass.

Operation of the embodiments of the present disclosure is best observed by comparing FIGS. 1 and 2. As seen in FIG. 1, hydraulic fluid enters the fluid reservoir 102 through inlet 116 and follows temporary flow path A. Dissolvable membrane 104 blocks the port 118 in baffle disk 106, so that flow path A continues through openings 110 and into the collection zone 115, lying between filter 112 and the sidewalls of reservoir 102. This path continues through intercepting filter element 117 and into central aperture 113, after which the fluid exits the reservoir through outlet 114. Contaminants 120 are removed from the flowing hydraulic fluid and retained in collection zone 115.

Operation on temporary flow path A continues for about 1-2 minutes, assuming an internal operating temperature of about 80° C. During that time, dissolvable membrane 104 dissolves. That event precipitates what may be termed a self-bypass, as seen in FIG. 2. With the membrane removed, flow shifts to the low-pressure route, permanent flow path B. Fluid in the reservoir passes through port 118 and then central aperture 113, exiting via outlet 114.

It has been found that an initial period of 1-2 minutes during initial engine operation suffices to filter large, potentially hazardous contaminant particles from the hydraulic system. Afterward, the system can operate in a steady-state fashion without a filter. It should be noted that filtering contaminants using the disclosed method sequesters the contaminants in collection zone 115, where they are unlikely to re-enter circulation.

Primary applications of such a system is found in hydraulic steering systems of vehicles, employed with a steering unit and a hydraulic pump configured to pump hydraulic fluid in the steering system.

As described, the disclosed system and its components could be applied to a variety of fluid systems as well without departing from the scope of the present disclosure.

It should be noted that this description does not set out specific details of the system, materials, design, or method of manufacture of the various components. Those skilled in the art are familiar with such details, and unless departures from those techniques are set out, techniques, designs, and materials known in the art should be employed. Those in the art are capable of choosing suitable manufacturing and design details.

The terminology used herein describes particular embodiments only and is not intended to be limiting of the disclosure. It will be appreciated that several of the disclosed and other features and functions, or alternatives thereof, may be desirably combined into many other different systems or applications. Various presently unforeseen or unanticipated alternatives, modifications, variations, changes, or improvements therein may be subsequently made by those skilled in the art, which are also intended to be encompassed by the following claims.

The invention claimed is:

1. A hydraulic fluid reservoir for filtering hydraulic fluid, the hydraulic fluid reservoir including:
   a flat baffle disk secured to an inner wall of the reservoir and dividing said reservoir into a top portion having an inlet, and a bottom portion having an outlet, said baffle disk having a central fluid port and a plurality of peripheral openings;
   a cylindrical filter disposed within said bottom portion, the cylindrical filter having a cylindrical filter element surrounding a central aperture, said central aperture extending directly from the central fluid port to the outlet,
   a membrane, dissolvable by hydraulic fluid, fixed into said central fluid port to completely block said central fluid port;
   wherein hydraulic fluid initially flows on a temporary flow path from the inlet into the top portion of the hydraulic fluid reservoir, through said peripheral openings into the bottom portion, then through said cylindrical filter element into the central aperture and out through the outlet; after a predetermined period hydraulic fluid dissolves the membrane and hydraulic fluid may flow on a permanent flow path from the inlet directly through the central fluid port into the central aperture and through the outlet, bypassing the filter element.

2. The system of claim 1, wherein the baffle disk comprises grooves and slots to retain and restrict the filter from vibratory movements.

3. The system of claim 1, wherein the membrane comprises a material selected from the group consisting of polystyrene, low density polyethylene, polymethylpentene and polycarbonate.

4. The system of claim 1, wherein the filter element is a material selected from the group consisting of cotton waste, pleated filter paper, mesh made of nylon, polypropylene, brass, copper, steel, stainless steel, aluminum and polyester.

5. The system of claim 1, wherein the top portion of the fluid reservoir comprises snapping clips for securing the baffle disk to the inner wall of the fluid reservoir.

6. A hydraulic steering system in a vehicle comprising:
   a steering unit;
   a hydraulic pump for pumping hydraulic fluid in the steering system; and
   a hydraulic fluid reservoir including:
      a flat baffle disk secured to an inner wall of the reservoir and dividing said reservoir into a top portion having an inlet, and a bottom portion having an outlet, said baffle disk having a central fluid port and a plurality of peripheral openings;
      a cylindrical filter disposed within said bottom portion, the cylindrical filter having a cylindrical filter element surrounding a central aperture, said central aperture extending directly from the central fluid port to the outlet,
      a membrane, dissolvable by hydraulic fluid, fixed into said central fluid port to completely block said central fluid port;
      wherein hydraulic fluid initially flows on a temporary flow path from the inlet into the top portion of the hydraulic fluid reservoir, through said peripheral openings into the bottom portion, then through said cylindrical filter element into the central aperture and out through the outlet; after a predetermined period hydraulic fluid dissolves the membrane and hydraulic fluid may flow on a permanent flow path from the inlet directly through the central fluid port into the central aperture and through the outlet, bypassing the filter element.

7. The system of claim 6, wherein the baffle disk comprises grooves and slots to retain and restrict the filter from vibratory movements.

8. The system of claim 6, wherein the membrane comprises a material selected from the group consisting of polystyrene, low density polyethylene, polymethylpentene and polycarbonate.

9. The system of claim 6, wherein the filter element is a material selected from the group consisting of cotton waste, pleated filter paper, mesh made of nylon, polypropylene, brass, copper, steel, stainless steel, aluminum and polyester.

10. The system of claim 6, wherein the top portion of the fluid reservoir comprises snapping clips for securing the baffle disk to the inner wall of the fluid reservoir.

* * * * *